United States Patent
He et al.

(10) Patent No.: US 10,424,997 B2
(45) Date of Patent: Sep. 24, 2019

(54) MOTOR AND ROTARY ASSEMBLY THEREOF

(71) Applicant: JOHNSON ELECTRIC INTERNATIONAL AG, Murten (CH)

(72) Inventors: Wan Mei He, Shenzhen (CN); Jing Chen, Shenzhen (CN); Jun Jie Chu, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 118 days.

(21) Appl. No.: 15/584,754

(22) Filed: May 2, 2017

(65) Prior Publication Data
US 2017/0331355 A1    Nov. 16, 2017

(30) Foreign Application Priority Data

May 11, 2016    (CN) .......................... 2016 1 0313474

(51) Int. Cl.
| | |
|---|---|
| H02K 23/04 | (2006.01) |
| H02K 37/12 | (2006.01) |
| H02K 1/18 | (2006.01) |
| H02K 1/27 | (2006.01) |
| H02K 5/22 | (2006.01) |
| H02K 11/33 | (2016.01) |
| H02K 7/08 | (2006.01) |
| H02K 26/00 | (2006.01) |
| H02K 37/02 | (2006.01) |

(52) U.S. Cl.
CPC ............. *H02K 23/04* (2013.01); *H02K 1/187* (2013.01); *H02K 1/2786* (2013.01); *H02K 5/225* (2013.01); *H02K 11/33* (2016.01); *H02K 37/12* (2013.01); *H02K 7/083* (2013.01); *H02K 26/00* (2013.01); *H02K 37/02* (2013.01)

(58) Field of Classification Search
CPC ......... H02K 23/04; H02K 37/12; H02K 7/083
See application file for complete search history.

(56) References Cited

U.S. PATENT DOCUMENTS

| | | | | |
|---|---|---|---|---|
| 5,528,092 A | * | 6/1996 | Ohta ................... | G11B 19/2009 310/156.26 |
| 5,744,881 A | * | 4/1998 | Ishizuka ............ | G11B 19/2009 310/156.26 |
| 6,018,438 A | * | 1/2000 | Nottingham ....... | G11B 19/2009 310/156.08 |
| 8,067,870 B2 | * | 11/2011 | Kobayashi ............. | H02K 29/12 310/156.05 |

* cited by examiner

*Primary Examiner* — Dang D Le (74) *Attorney, Agent, or Firm* — Muncy, Geissler, Olds & Lowe, P.C.

(57) ABSTRACT

A motor and a rotary assembly of the motor are provided. The motor includes a rotary assembly and a stationary assembly supporting the rotary assembly. The rotary assembly includes a rotary shaft, a retainer rotating along with the rotary shaft, and a rotor magnet retained by the retainer. A portion of the rotor magnet engages with a portion of the retainer via interference fit, and a gap is defined between another portion of the rotor magnet and another portion of the retainer.

9 Claims, 5 Drawing Sheets

MOTOR AND ROTARY ASSEMBLY THEREOF

CROSS REFERENCE TO RELATED APPLICATIONS

This non-provisional patent application claims priority under 35 U.S.C. § 119(a) from Patent Application No. 201610313474.0 filed in The People's Republic of China on May 11, 2016.

FIELD OF THE INVENTION

The present invention relates to a motor and a rotary assembly of the motor.

BACKGROUND OF THE INVENTION

Motors are usually used in electronic devices, communication devices (such as antennas) or other devices (such as cars) to drive an object to rotate or translate. The motor usually includes a rotor magnet engaging with a retainer. The mating surfaces of the rotor magnet and the retainer are the same, it is difficult to assemble the rotor magnet and control tolerance.

SUMMARY OF THE INVENTION

Accordingly, there is a desire for a motor having a stable rotor magnet that can be conveniently assembled, and a rotary assembly of the motor.

A motor includes a rotary assembly and a stationary assembly supporting the rotary assembly. The rotary assembly includes a rotary shaft extending along the central axis, a retainer rotating along with the rotary shaft, and a rotor magnet retained by the retainer. A portion of the rotor magnet engages with a portion of the retainer via interference fit, and a gap is defined between another portion of the rotor magnet and another portion of the retainer.

Preferably, the rotor magnet is attached to an inner surface of the retainer, the rotor magnet comprises a first end and a second end opposite the first end, and the first end has an outer diameter less than an outer diameter of the second end.

Preferably, the retainer comprises a first lateral surface, the rotor magnet comprises a second lateral surface facing the first lateral surface of the retainer, at least a portion of one of the first lateral surface and second lateral surface is of a conical surface, and the other one of the first lateral surface and second lateral surface is of a circular cylindrical surface.

Preferably, an opposite surface of the rotor magnet opposite to the second lateral surface is of a circular cylindrical surface.

Preferably, the gap between the rotor magnet and the retainer is filled with adhesive.

Preferably, the stationary assembly includes a stator core, a plurality of coils wound around the stator core, a circuit board in electrical connection with the coils, and a supporting part supporting the stator core and the circuit board. The supporting part is a die-casting part.

Preferably, an insulation washer is disposed between the supporting part and the circuit board.

Preferably, the motor further comprises two groups of cables, and two groups of connection ports are defined in the circuit board, the two groups of cables extend through the supporting part and are connected with corresponding ones of the connection ports, respectively.

A rotary assembly of a motor includes a rotary shaft extending along a central axis of the motor, a retainer rotating along with the rotary shaft, and a rotor magnet retained by the retainer. The retainer comprises a first lateral surface, and the rotor magnet comprises a second lateral surface, a portion of the second lateral surface engaging with the first lateral surface via interference fit, and a gap being defined between another portion of the second lateral surface and the first lateral surface.

Preferably, one of the first lateral surface and the second lateral surface is of a circular cylindrical shape, and at least a portion of the other of the first lateral surface and the second lateral surface is of a conical shape.

Preferably, the first lateral surface is an inner lateral surface of the retainer, and the second lateral surface is an outer lateral surface of the rotor magnet.

Preferably, the first lateral surface is an outer lateral surface of the retainer, and the second lateral surface is an inner lateral surface of the rotor magnet.

Preferably, the gap between the rotor magnet and the retainer is filled with adhesive.

A motor includes a rotary assembly and a stationary assembly supporting the rotary assembly. The rotary assembly includes a rotary shaft extending along a central axis of the motor, a retainer rotating along with the rotary shaft, and rotor magnet retained by the retainer. The retainer includes a first lateral surface. The rotor magnet includes a second lateral surface engaging with the first lateral surface. One of the first lateral surface and the second lateral surface is of a circular cylindrical shape, and at least a portion of the other of the first lateral surface and the second lateral surface is of a conical shape.

Preferably, a gap is defined between the rotor magnet and the retainer, and the gap is filled with adhesive.

In the above motor, different portions of the rotor magnet are connected with the retainer by different means, this facilitates assembling the rotor magnet with the retainer.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present invention, any other embodiment obtained by a person skilled in the art without paying any creative effort shall fall within the protection scope of the present invention.

When a component is described to be "connected" to another component, it can be directly connected to the another component or there may be an intermediate component.

Unless otherwise specified, all technical and scientific tennis have the ordinary meaning as commonly understood by people skilled in the art. The terms used in this disclosure are illustrative rather than limiting. The term "and/or" used in this disclosure means that each and every combination of one or more associated items listed are included.

Figure 1:
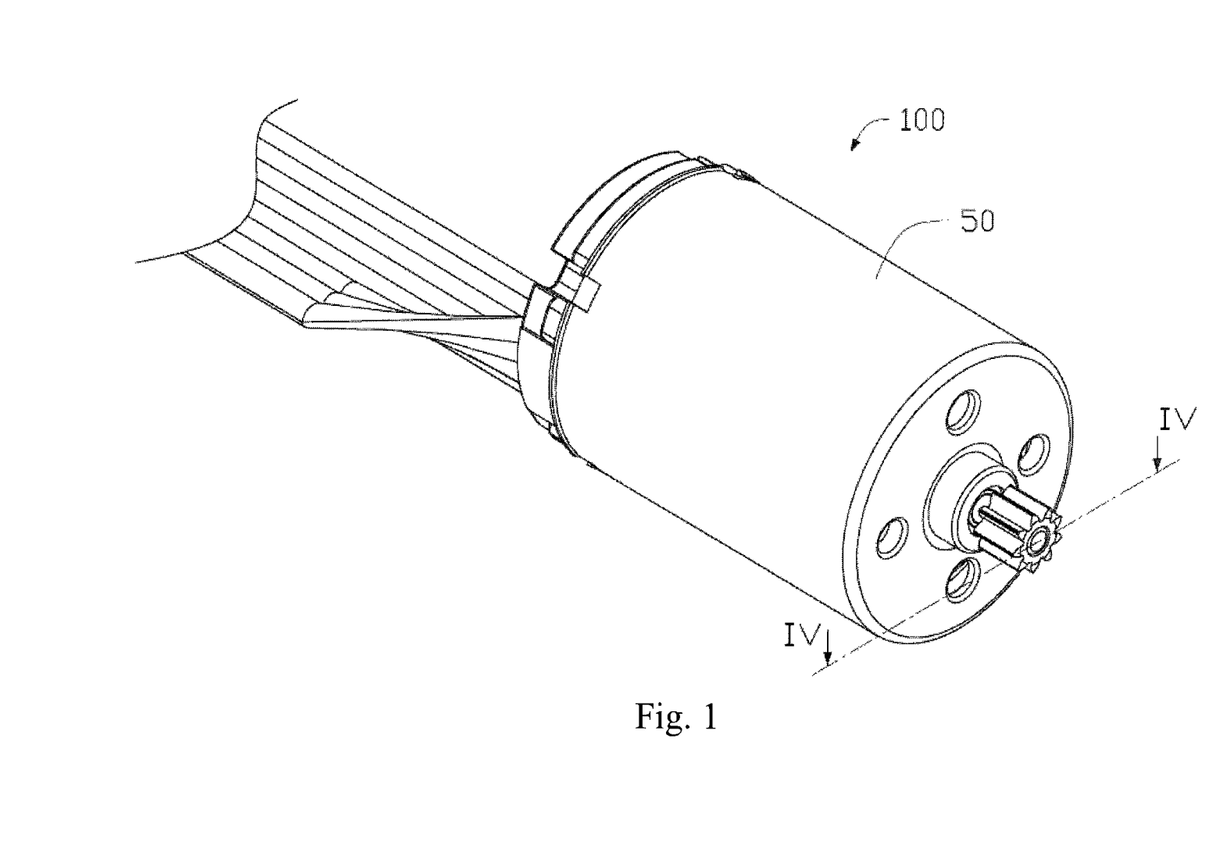
FIG. 1 is a perspective view of a motor according to one embodiment of the present invention.

Referring to FIG. 1, a motor 100 in accordance with one embodiment of the present invention is used to drive an external device (not shown) to rotate or drive an external device to rotate through a transmission mechanism (not shown). Specifically, the external device may be a device that operates under electric power (such as a communication device or an electronic device) or a device that operates without electric power (such as a vehicle window). In this embodiment, the motor 100 is used in an antenna.

Figure 2:
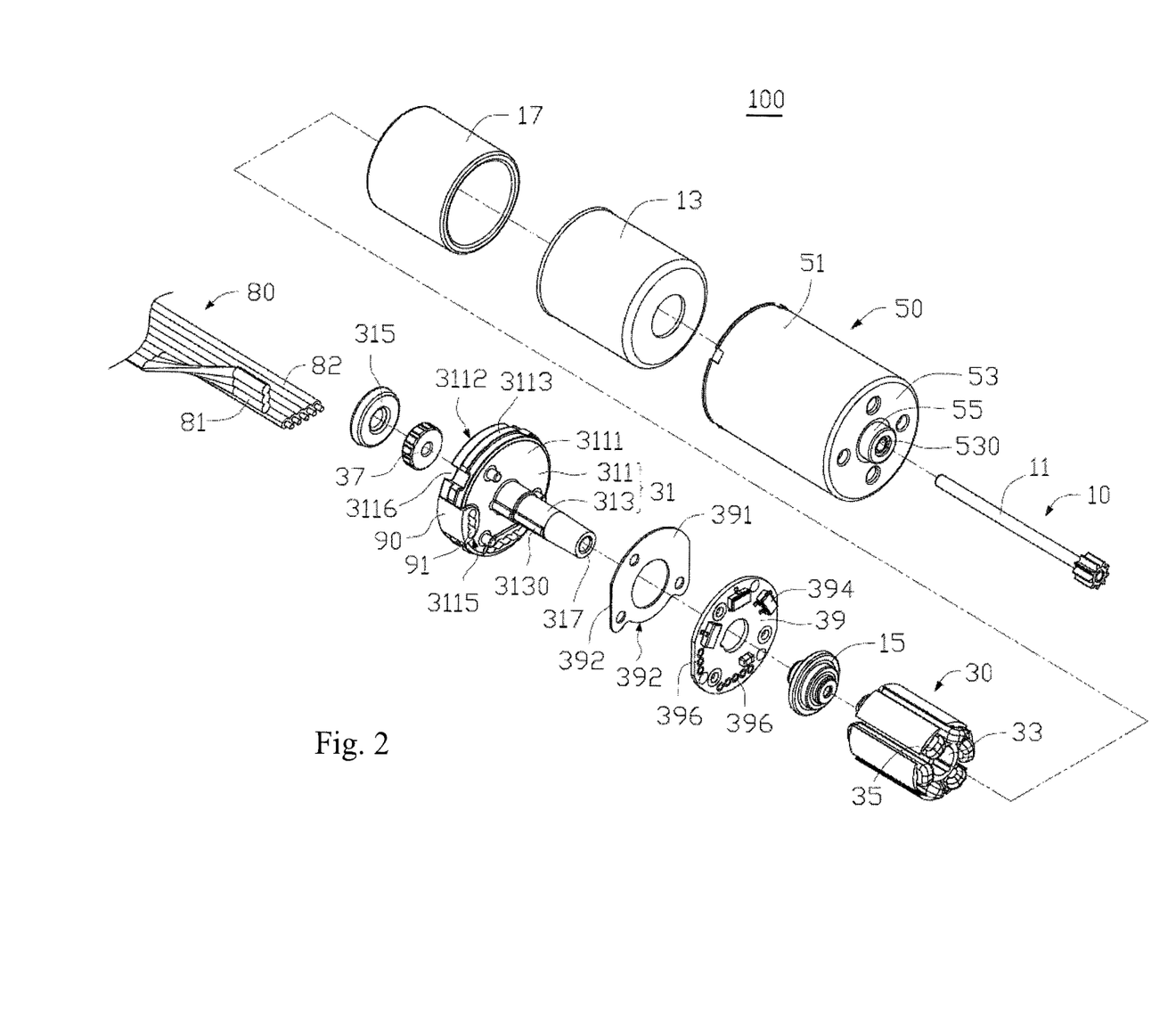
FIG. 2 is a perspective, exploded view of the motor shown in FIG. 1.
Figure 3:
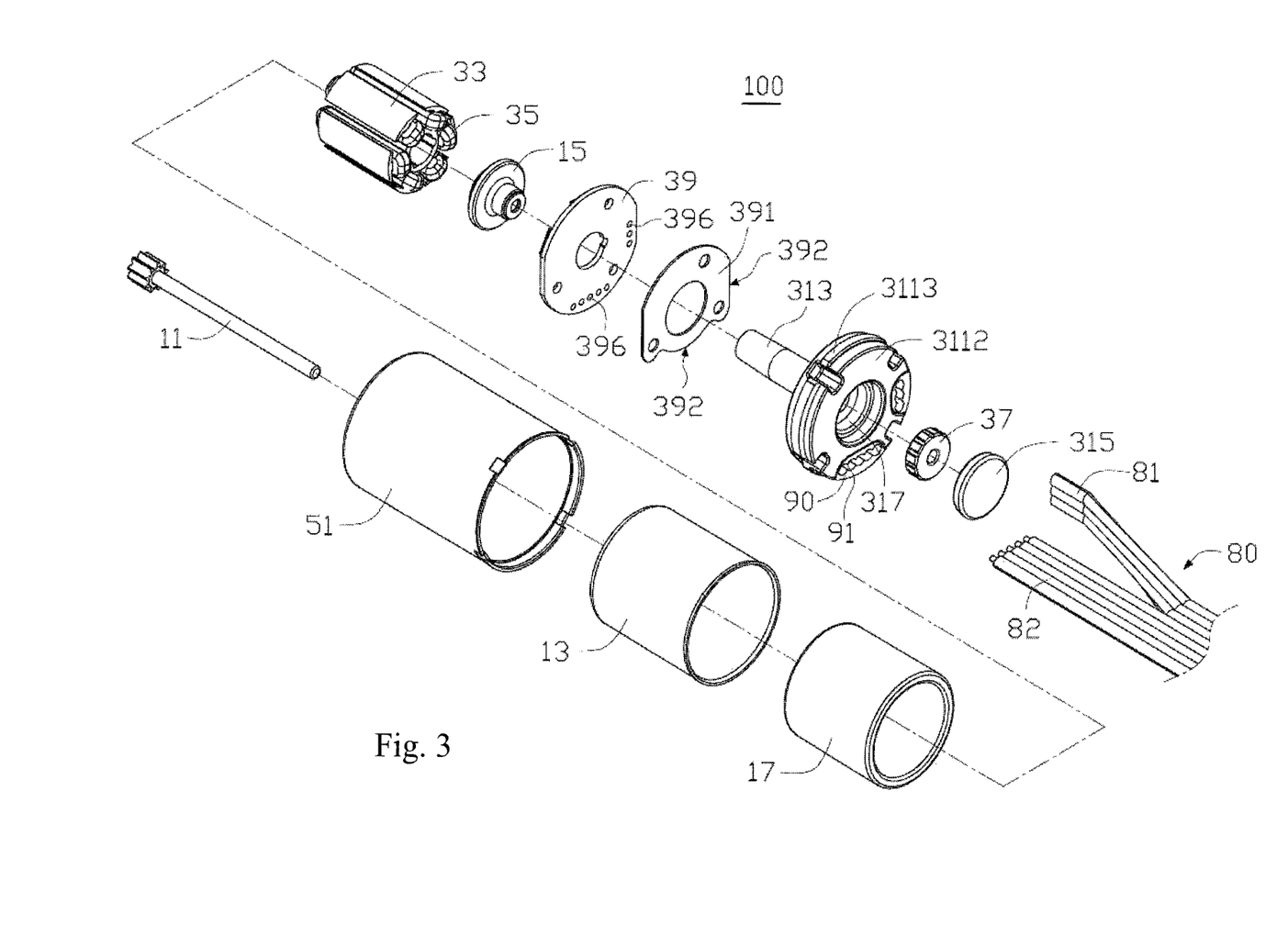
FIG. 3 is a perspective, exploded view of the motor shown in FIG. 1, but viewed from another aspect.

Referring to FIG. 2 and FIG. 3, the motor 100 includes a rotary assembly 10 which rotates around a central axis of the motor 100, a stationary assembly 30 supporting the rotary assembly 10 for rotation, a motor housing 50 which accommodates at least a portion of the rotary assembly 10 and at least a portion of the stationary assembly 30. Central axes of the rotary assembly 10, the stationary assembly 30 and the motor housing 50 are coincident with each other.

The rotary assembly 10 includes a rotary shaft 11 extending along the central axis of the motor 100, a retainer 13 rotating along with the rotary shaft 11, a supporting member 15 supporting the retainer 13, and a rotor magnet 17 retained in the retainer 13.

The rotary shaft 11 is substantially of a rod shape, and has one end extending through the motor housing 50, thereby extending to an outside of the motor housing 50. The retainer 13 is substantially of a hollow cylindrical shape, and is disposed around the rotary shaft 11 with a gap formed therebetween. The supporting member 15 is fixed to the rotary shaft 11 and to one end of the retainer 13, such that the retainer 13 is able to rotate along with the rotary shaft 11 through the supporting member 15. In other embodiments, the supporting member 15 may be omitted, and the retainer 13 is directly connected with the rotary shaft 11. In this embodiment, the supporting member 15 and the retainer 13 are fixed together by means of riveting. In other embodiments, the supporting member 15 and the retainer 13 may also be fixed together in other manners such as welding.

Figure 4:
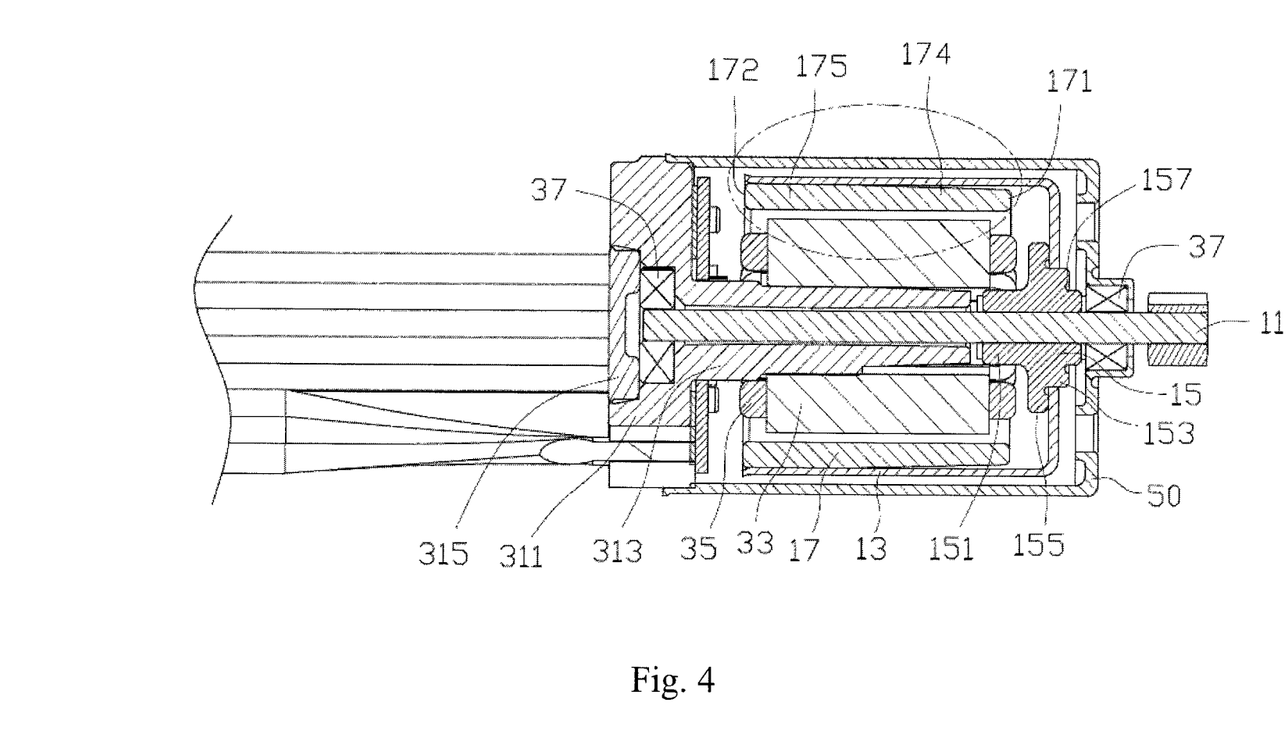
FIG. 4 is a sectional view of the motor shown in FIG. 1 taken alone line Iv-Iv thereof.

Referring also to FIG. 4, the supporting member 15 includes a tubular body 151, and a first flange 153 and a second flange 155 which protrude radially from an outer circumference of the body 151. The first flange 153 and the second flange 155 are connected to form a stepped configuration. The second flange 155 has a protruding radius greater than that of the first flange 153. An annular groove 157 is defined in an end surface of each of the first flange 153 and the second flange 155. The body 151 is attached around the rotary shaft 11, one end of the retainer 13 is attached around an outer circumferential surface of the first flange 153, and an inner surface of the end of the retainer 13 is supported on the end surface of the second flange 155 adjacent the first flange 153 (i.e. the end surface of the second flange 155 where the annular groove 157 is defined).

Figure 5:
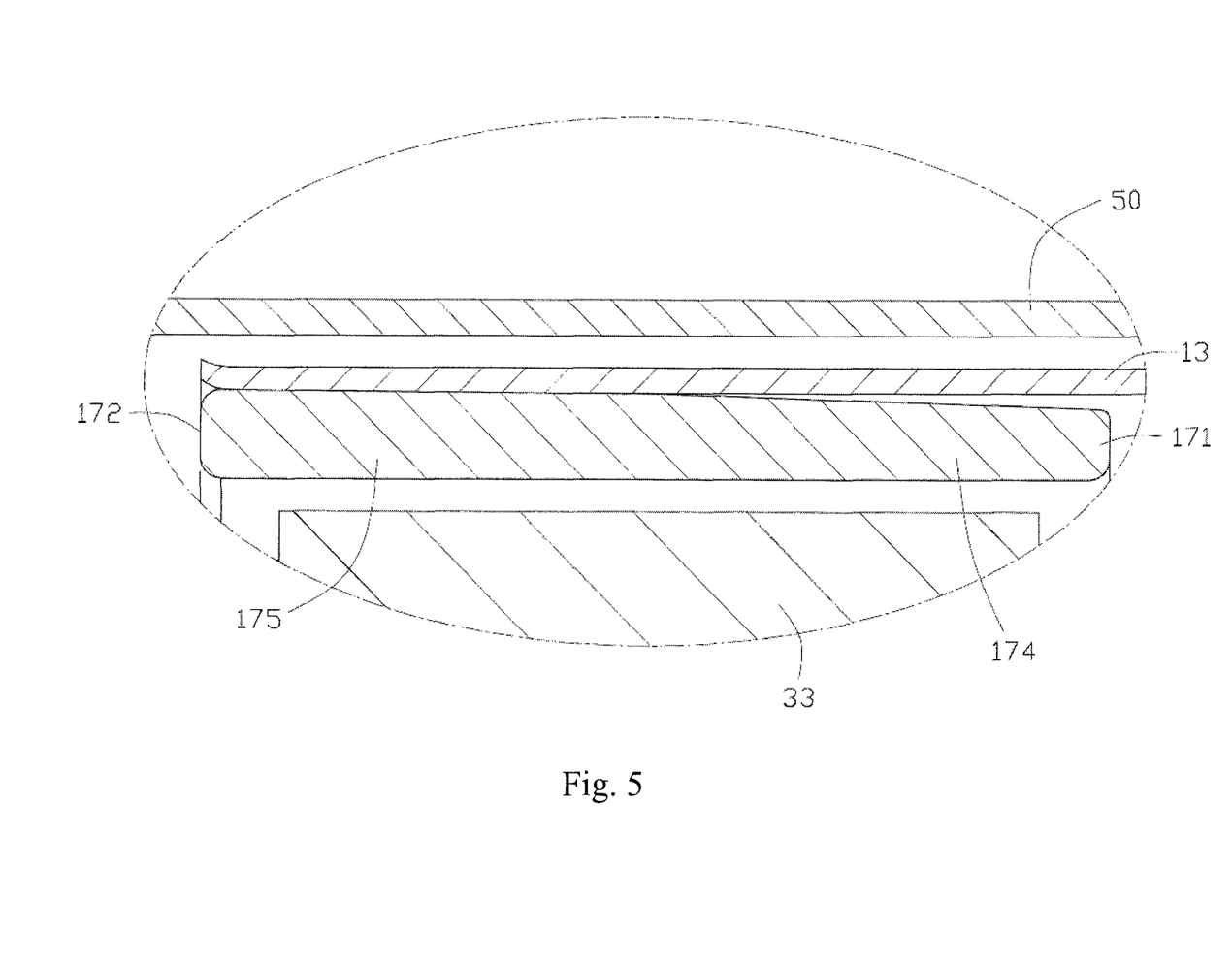
FIG. 5 is a partial, enlarged view of the motor shown in FIG. 4.

Referring to FIGS. 4 and 5, the rotor magnet 17 is disposed in the retainer 13 and is supported by the retainer 13. The rotor magnet 17 is adjacent the retainer 13 and is disposed around the rotary shaft 11. Central axes of the rotor magnet 17 and the rotor shaft 11 are coincident with each other.

The rotor magnet 17 is substantially of a hollow conical shape, with an outer lateral surface being a conical surface. The rotor magnet 17 includes a first end 171 adjacent the supporting member 15 and a second end 172 opposite the first end 171. The first end 171 has an outer diameter less than that of the second end 172. The outer diameter of the first end 171 is 13.27 mm to 13.35 mm, and the outer diameter of the second end 172 is 13.40 mm to 13.48 mm. In other embodiments, the outer diameters of the first end 171 and the second end 172 may vary according to needs. In this embodiment, the outer diameter of the rotor magnet 17 progressively increases from the first end 171 towards the second end 172. In other embodiment, the outer diameter of the rotor magnet 17 may not progressively increase, but rather it may, for example, increase intermittently. In other embodiments, the outer diameter of the first end 171 and/or the second end 172 is not limited to the above range.

The rotor magnet 17 includes a first portion 174 and a second portion 175 which are formed integrally. The first portion 174 is adjacent the first end 171, and the second portion 175 is adjacent the second end 172. A gap is defined between the first portion 174 of the rotor magnet 17 and the retainer 13, and an interference fit is formed between the second portion 175 of the rotor magnet 17 and the retainer 13. That is to say, an inner diameter of the retainer 13 is greater than an outer diameter of the first portion 174 of the rotor magnet 17, and is less than an outer diameter of the second portion 175 of the rotor magnet 17.

The gap between the first portion 174 of the rotor magnet 17 and the retainer 13 is filled with adhesive, thereby fixing the rotor magnet 17 to the retainer 13. The interference fit between the second portion 175 of the rotor magnet 17 and the retainer 13 further increases fixation strength between the rotor magnet 17 and the retainer 13. In this embodiment, the gap between the first portion 174 of the rotor magnet 17 and the retainer 13 has a width of 0.005 mm to 0.065 mm, i.e. a distance between the first portion 174 of the rotor magnet 17 and the retainer 13 is 0.005 mm to 0.065 mm. In other embodiments, the width of the gap between the first portion 174 of the rotor magnet 17 and the retainer 13 may vary according to needs. A width of the interference fit between the second portion 175 of the rotor magnet 17 and the retainer 13 is 0 mm to 0.06 mm, i.e. an amount of mutual interference between the second portion 175 of the rotor magnet 17 and the retainer 13 is 0 mm to 0.06 mm. In other embodiments, the width of the interference fit between the second portion 175 of the rotor magnet 17 and the retainer 13 may vary according to needs. As can be readily seen, since the outer lateral surface of the rotor magnet 17 is a conical surface, the width of the gap between the first portion 174 of the rotor magnet 17 and the retainer 13 is not fixed, and the degree of interference fit between the second portion 175 of the rotor magnet 17 and the retainer 13 is not fixed, either. In other embodiments, the gap between the first portion 174 of the rotor magnet 17 and the retainer 13 may not be filled with the adhesive, and the rotor magnet 17 may be fixed to the retainer 13 via the interference fit between the second portion 175 of the rotor magnet 17 and the retainer 13.

It should be understood that a combination of the first portion 174 and second portion 175 of the rotor magnet 17 is not limited to be equal to the whole rotor magnet 17, but rather it may be the whole or a portion of the rotor magnet 17. For example, there may be a third portion between the first portion 174 and the second portion 175, or at one side of the first portion 174 and/or the second portion 175, and an outer diameter of the third portion may be equal to the inner diameter of the retainer 13. In this case, a portion of the structure of the rotor magnet 17 is of a conical shape, and a portion of the outer lateral surface of the rotor magnet 17 is a conical surface. An inner side of the rotor magnet 17 is of a hollow cylindrical shape, and the whole rotor magnet 17 is uniform in inner diameter, i.e. an inner diameter of the first portion 174 of the rotor magnet 17 is equal to an inner diameter of the second portion 175, and an inner diameter of the first end 171 is equal to an inner diameter of the second end 172, thereby ensuring that the magnet generates a stable magnetic circuit. In other embodiments where the rotor magnet 17 further includes the third portion, an inner diameter of the third portion is equal to the inner diameter of the first portion 174 and the second portion 175.

The stationary assembly 30 includes a supporting part 31, a stator core 33, a plurality of coils 35, two rolling bearings 37, and a circuit board 39 electrically connected with the coils 35. The supporting part 31 is used to support the stator core 33 and the circuit board 39. The coils 35 are wound around the stator core 33, respectively. The two rolling bearings 37 are both attached around the rotary shaft 11. One of the two rolling bearings 37 is disposed between the rotary shaft 11 and the motor housing 50, and the other is disposed between the rotary shaft 11 and the supporting part 31, for supporting the rotary shaft 11 for rotation. When the coils 35 are energized, the stator core 33 generates a magnetic field, and a rotational torque is thus generated between the stator core 33 and the rotor magnet 17.

The supporting part 31 includes a circuit board supporting portion 311 and a stator supporting portion 313. A through hole 317 is defined through the supporting part 31 along a central axis of the supporting part 31. The through hole 317 extends through the circuit board supporting portion 311 and the stator supporting portion 313, for allowing the rotary shaft 11 to extend therethrough. A hole diameter of a portion of the through hole 317 extending through the circuit board supporting portion 311 is greater than a hole diameter of a portion of the through hole 317 extending through the stator supporting portion 313.

The circuit board supporting portion 311 is substantially of a cylindrical shape, and includes a first end wall 3111, a second end wall 3112 opposite the first end wall 311, and a peripheral wall 3113 connecting the first end wall 3111 to the second end wall 3112. The first end wall 3111 is closer to the stator supporting portion 313 than the second end wall 3112. The first end wall 3111 is used to support the circuit board 39.

Two receiving grooves 3115 and four mounting grooves 3116 are defined in the circuit board supporting portion 311. The two receiving grooves 3115 are each disposed between adjacent two mounting grooves 3116. Each receiving groove 3115 extends through the first end wall 3111, the second end wall 3112 and the peripheral wall 3113. Each mounting groove 3116 extends through the second end wall 3112 and the peripheral wall 3113, for assembling the supporting part 31 with other components, for example, assembling the supporting part 31 with a protective casing. In this embodiment, the circuit board supporting portion 311 of the supporting part 31 is used as an endcap of the motor.

In this embodiment, the stationary assembly 30 further includes a substantially circular closing cap 315. The closing cap 315 is received in the through hole 317, and is flush with the second end wall 3112 of the circuit board supporting portion 311 to close the through hole 317.

The stator supporting portion 313 is connected with the circuit board supporting portion 311. The stator supporting portion 313 is substantially of a rod shape, and has a diameter decreasing in a direction away from the circuit board supporting portion 311. A rib 3130 protrudes from a lateral wall of the stator supporting portion 313, for strengthening the connection with the stator core 33. In this embodiment, the circuit board supporting portion 311 and the stator supporting portion 313 are integrally formed. In other embodiments, the circuit board supporting portion 311 and the stator supporting portion 313 may be forming by assembling separate components. In this embodiment, the supporting part 31 is formed via die casting, i.e. the supporting part 31 is a die-casting part. In other embodiments, the supporting part 31 may be formed in other manners. In this embodiment, the circuit board supporting portion 311 and the stator supporting portion 313 are made of a metal material.

The stator core 33 is fixedly attached around the stator supporting portion 313, and is surrounded by the rotor magnet 17. In this embodiment, the number of the coils 35 is, but not limited to, six, and the coils 35 are wound around the stator core 33.

One of the two rolling bearings 37 is received in the through hole 317 between the rotary shaft 11 and the circuit board supporting portion 311. The other of the two rolling bearings 37 is disposed between the rotary shaft 11 and the motor housing 50. The two rolling bearings 37 are adjacent two ends of the rotary shaft 11, respectively.

The circuit board 39 is fixed to the first end wall 3111 of the circuit board supporting portion 311. An insulation washer 391 is disposed between the circuit board 39 and the first end wall 3111. The insulation washer 391 is made of an insulation material, such as plastic.

A plurality of electronic components 394 is disposed on the circuit board 39. The electronic components 394 do not only refer to one kind of components, but are a general term for components used in a driving circuit. For example, the electronic components 394 may include a power control IC, a DC-DC converter, a Hall component or the like. The electronic components 394 may further include a plurality of MOS transistors. The plurality of MOS transistors may be integrated in a chip, or separately disposed on the circuit board 39. Two groups of spaced connection ports 396 are defined in the circuit board 39. One group of connection ports 396 includes five connection ports 396 arranged side by side. The other group of connection ports 396 includes three connection ports 396 arranged side by side. In this embodiment, the two groups of connection ports 396 are not located on a same straight line.

In this embodiment, the motor 100 further includes a plurality of cables 80 and two wire routing blocks 90. The two wiring routing blocks 90 are installed in the two receiving grooves 3115, respectively. A wire routing groove 91 is defined in each wiring routing block 90. The wire routing groove 91 in one of the wire routing blocks 90 has a width allowing five cables 80 to pass therethrough, and the wire routing groove 91 in the other of the wire routing blocks 90 has a width allowing three cables 80 to pass therethrough. Each wire routing groove 91 has a contour matching an outer shape of the cables. The plurality of cables 80 are divided into two groups at their ends. A first cable group 81 includes three cables, and a second cable group 82 includes five cables. The two groups of cables 80 extend through corresponding wire routing grooves 91 of the wire routing blocks 90, respectively, and are connected with corresponding connection ports 396 in the circuit board 39. Two avoidance cutouts 392 are defined in the insulation washer 391 corresponding to the two groups of connection ports 396, for facilitating connecting the cables 80 to the circuit board 39. After the cables 80 connected with corresponding connection ports 396, distal ends of the cables 80 are sealed with glue. The cables may be but not limited to cables for testing. In other embodiments, the quantity of cables in either of the first cable group 81 and the second cable group 82 may not be limited to the above numbers. The quantity of cables in the first cable group 81 and/or the second cable group 82 may be greater than or equal to one. Accordingly, the quantity of the connection ports 396 in each group and the width of the wire routing groove 91 may be adjusted correspondingly.

The motor housing 50 is substantially of a hollow tubular shape, which receives the rotary assembly 10 and the stationary assembly 30, and allows the rotary shaft 11 to extend out. The motor housing 50 includes a periphery wall 51, an end wall 53 disposed at an end of the periphery wall 51, and an extending wall 55 which extends from a middle of the end wall 53 along a central axis direction. The periphery wall 51 is substantially of a circular tubular shape, and has an inner space for receiving the retainer 13, the rotor magnet 17, the stator core 33, the coils 35, a middle section of the rotary shaft 11, the circuit board 39, the supporting member 15 and the supporting part 31. An end of the periphery wall 51 away from the end wall 53 is attached around the circuit board supporting portion 311.

The end wall 53 covers an end of the periphery wall 51 away from the circuit board 39. A through hole 530 is defined in a center of the end wall 53, for allowing the rotary shaft 11 to extend therethrough. The extending wall 55 extends from an inner edge of the end wall 53 bounding the through hole 530. The rotary shaft 11 extends through a center of the extending wall 55. One of the two rolling bearings 37 is attached around the rotary shaft 11 between the rotary shaft 11 and the extending wall 55 for supporting the rotary shaft 11.

One method for assembling the motor 100 of the present invention is described as follows. It should be understood that the assembling process may not be limited to the following sequence of assembling steps or assembling direction.

The circuit board 39 is installed on the circuit board supporting portion 311, and the coils 35 are wound around the stator core 33. The stator core 33 is then fixed to the stator supporting portion 313. The supporting member 15 is attached around the rotary shaft 11. The rotor magnet 17 is fixed to the retainer 13, and then the supporting member 15 is fixed to the retainer 13 by means of riveting. Opposite ends of the rotary shaft 11 are exposed out of the retainer 13. One rolling bearing 37 is installed in the through hole 317 from an end of the supporting part 31 away from the stator supporting portion 313. The closing cap 315 is installed to close the end of the through hole 317 away from the stator supporting portion 313. One end of the rotary shaft 11 is inserted into the through hole 317 and the rolling bearing 37 installed in the through hole 317 from an end of the supporting part 31 away from the circuit board supporting portion 311. The other rolling bearing 37 is attached around the rotary shaft 11 adjacent the supporting member 15. The motor housing 50 is attached around an outside of the rotary assembly 10 and the stationary assembly 30, with the other rolling bearing 37 engaging with the extending wall 55.

In the above assembling process, the manner of fixing the rotor magnet 17 to the retainer 13 may be but not limited to the following manner: coating adhesive on the first portion 174 of the rotor magnet 17, and then inserting the rotor magnet 17 into the retainer 13 from an open end of the retainer 13 until the second portion 175 of the rotor magnet 17 is also received in the retainer 13 via interference fit. It should be understood that during the process of assembling the rotor magnet 17 with the retainer 13, the adhesive may not be coated on the rotor magnet 17 in advance; rather, an injection structure is provided to inject the adhesive between the first portion 174 of the rotary magnet 17 and the retainer 13 after the rotor magnet 17 is received in the retainer 13 via interference fit.

It should be understood that, in another embodiment, both of the outer lateral surface and the inner lateral surface of the rotator magnet may be configured to have a circular cylindrical surface, and at least a portion of an inner lateral surface of the retainer is configured to have a conical surface. That is, the retainer may include a first portion and a second portion. One of the first portion and second portion of the retainer engages with the rotary magnet via interference fit, and the rotary magnet and the other of the first portion and second portion of the retainer define therebetween a gap which may be filled with adhesive.

It should be understood that, in other embodiments, the motor may not be limited to the above outer-rotor motor. For example, the motor may be an inner-rotor motor. In this case, the retainer may be disposed in an interior of the rotor magnet to retain the rotor magnet. In such a case, one of an outer lateral surface of the retainer and an inner lateral surface of the rotor magnet may be of a conical surface, and the other of the outer lateral surface of the retainer and the inner lateral surface of the rotor magnet may be of a circular cylindrical shape. The gap between the retainer and the rotor magnet may be filled with adhesive, such that the retainer and the rotor magnet are fixed together by means of interference fit and adhesive. The outer lateral surface of the rotor magnet may be of a circular cylindrical surface to generate a stable magnetic circuit.

It should be understood that, in other embodiments, when at least a portion of the inner lateral surface or the outer lateral surface of the rotary magnet is a conical surface, the corresponding outer lateral surface or the inner lateral surface of the retainer may not be of a circular cylindrical surface; rather, it may be, for example, a conical surface with a different taper angle, which can likewise achieve that one portion of the rotary magnet engages with one portion of the retainer via interference fit, and a gap is defined between another portion of the rotary magnet and another portion of the retainer.

It should be understood that, in other embodiments, when at least a portion of the inner lateral surface or the outer lateral surface of the retainer is a conical surface, on the premise of not seriously affecting the magnetic circuit, the outer lateral surface or the inner lateral surface of the rotor magnet may not be of a cylindrical shape; rather, it may be, for example, a conical surface with a different taper angle, which can likewise achieve that one portion of the rotary magnet engages with one portion of the retainer via interference fit, and a gap is defined between another portion of the rotary magnet and another portion of the retainer.

In the motor 100, different portions of the rotor magnet 17 are connected with the retainer 13 by means of adhesive and interference fit, respectively, the interference fit therebetween can effectively prevent imbalance of the rotor magnet, and connection via adhesive further increases the connection firmness between the rotor magnet 17 and the retainer 13. Furthermore, the rotor magnet 17 is of a conical shape, which facilitates assembling the rotor magnet 17 with the retainer 13. The use of the die-casting supporting part 31 can reduce vibration of the motor 100 during operation.

The above embodiments are merely to illustrate the technical solutions of the present invention and are not intended to limit the present invention. Although the present invention has been described with reference to the above preferred embodiments, it should be appreciated by those skilled in the art that various modifications and variations may be made without departing from the spirit and scope of the present invention.

The invention claimed is:

1. A motor comprising:
a rotary assembly comprising:
a rotary shaft;
a retainer rotating along with the rotary shaft; and
a rotor magnet retained by the retainer; and
a stationary assembly supporting the rotary assembly,
wherein the retainer comprises a first lateral surface, the rotor magnet comprises a second lateral surface facing the first lateral surface of the retainer, one of the first lateral surface and second lateral surface is of a conical surface, and the other one of the first lateral surface and second lateral surface is of a circular cylindrical surface, a portion of the second lateral surface engages with a portion of the first lateral surface via interference fit, and a gap is defined between another portion of the second lateral surface and another portion of the first lateral surface.

2. The motor of claim 1, wherein the rotor magnet is completely received in the retainer, the first lateral surface is an inner lateral surface of the retainer, the second lateral surface is an outer lateral surface of the rotor magnet, and an outer diameter of the rotor magnet progressively increases from a first end towards a second end opposite to the first end.

3. The motor of claim 1, wherein an opposite surface of the rotor magnet opposite to the second lateral surface is of a circular cylindrical surface.

4. The motor of claim 1, wherein the gap between the rotor magnet and the retainer is filled with adhesive.

5. The motor of claim 1, wherein the stationary assembly comprises:
a stator core;
a plurality of coils wound around the stator core;
a circuit board in electrical connection with the coils; and
a supporting part supporting the stator core and the circuit board;
wherein the supporting part is a die-casting part.

6. The motor of claim 5, wherein an insulation washer is disposed between the supporting part and the circuit board.

7. The motor of claim 5, wherein the motor further comprises two groups of cables, and two groups of connection ports are defined in the circuit board, the two groups of cables extend through the supporting part and are connected with corresponding ones of the connection ports, respectively.

8. A motor comprising:
a rotary assembly comprising:
a rotary shaft;
a retainer rotating along with the rotary shaft; and
a rotor magnet retained by the retainer, a portion of the rotor magnet engaging with a portion of the retainer via interference fit, and a gap being defined between another portion of the rotor magnet and another portion of the retainer; and
a stationary assembly supporting the rotary assembly, the stationary assembly comprising:
a stator core;
a plurality of coils wound around the stator core;
a circuit board in electrical connection with the coils; and
a supporting part supporting the stator core and the circuit board;
wherein the supporting part is a die-casting part, and an insulation washer is disposed between the supporting part and the circuit board.

9. A motor comprising:
a rotary assembly comprising:
a rotary shaft;
a retainer rotating along with the rotary shaft; and
a rotor magnet retained by the retainer, a portion of the rotor magnet engaging with a portion of the retainer via interference fit, and a gap being defined between another portion of the rotor magnet and another portion of the retainer;
a stationary assembly supporting the rotary assembly, the stationary assembly comprising:
a stator core;
a plurality of coils wound around the stator core;
a circuit board in electrical connection with the coils; and
a supporting part supporting the stator core and the circuit board;
wherein the supporting part is a die-casting part; and
two groups of cables, wherein two groups of connection ports are defined in the circuit board, the two groups of cables extend through the supporting part and are connected with corresponding ones of the connection ports, respectively.

* * * * *